(12) United States Patent
Ehrlich

(10) Patent No.: US 6,375,844 B1
(45) Date of Patent: Apr. 23, 2002

(54) METHOD FOR TREATMENT OF ANIMAL WASTE

(76) Inventor: Robert T. Ehrlich, 1700 FM 1454, Follet, TX (US) 79034

(*) Notice: Subject to any disclaimer, the term of this patent is extended or adjusted under 35 U.S.C. 154(b) by 0 days.

(21) Appl. No.: 09/652,876

(22) Filed: Aug. 31, 2000

(51) Int. Cl.⁷ .................................................. C02F 3/30
(52) U.S. Cl. ...................................................... 210/605
(58) Field of Search ......................................... 210/605

(56) References Cited

U.S. PATENT DOCUMENTS

| | | | |
|---|---|---|---|
| 3,973,043 A | 8/1976 | Lynn | 426/55 |
| 4,137,158 A | 1/1979 | Ishida et al. | 210/16 |
| 4,298,621 A | 11/1981 | Samis et al. | 426/55 |
| 4,521,310 A | 6/1985 | Casey | 210/603 |
| 5,078,882 A | 1/1992 | Northrop | 210/602 |
| 5,472,472 A | 12/1995 | Northrop | 71/9 |
| 5,514,277 A | 5/1996 | Khudenko | 210/603 |
| 5,538,529 A | 7/1996 | Northrop | 71/9 |
| 5,540,839 A | * 7/1996 | Pirt | |
| 5,545,325 A | 8/1996 | Hsu et al. | 210/605 |
| 5,667,688 A | * 9/1997 | Kerrn-Jespersen | |
| 5,755,852 A | 5/1998 | Northrop | 71/9 |
| 5,798,043 A | 8/1998 | Khudenko | 210/603 |
| 5,846,424 A | 12/1998 | Khudenko | 210/603 |
| 5,863,434 A | 1/1999 | Masseet | 210/603 |
| 5,958,758 A | 9/1999 | Miller et al. | 435/268 |
| 6,039,874 A | 3/2000 | Teran et al. | 210/605 |
| 6,054,044 A | 4/2000 | Hoffland et al. | 210/96.1 |
| 6,083,386 A | 7/2000 | Lloyd | 210/195.1 |

FOREIGN PATENT DOCUMENTS

DE   3833185 A1   *   4/1990

OTHER PUBLICATIONS

Herrera, "Hog Heaven," Forbes, 236–37, Nov. 15, 1999.
"High–Rise Hog Barn Introduced," National Hog Farmer, 18, Jul. 15, 1999.
Leggett, et al., "Anaerobic digestion: biogas production and odor reduction from manure," PennState College of Agricultureal Sciences, Cooperative Extension, Agricultural and Biological Engineering , G 77.
Livestock Waste Facilities Handbook, Second Edition, 1985.
Meador, "Optimize value; minimize risk," Checkoff, 18–20, Fall 1999.
Miller, "Methane digesters: an odorless solution," Pork, 22–26, Jul. 1993.
Taiganides, "Pig waste management and recycling, the Singapore experience," International Development Research Centre, 263–96, 1992.
The Cornerstone of an Engineered Waste Management System, The Slurrystore Systems.
TimberTanks Water Storage Tanks, Permalon Division of Reef Industries, Inc.
"AgSTAR showcase series: langerwerf dairy," United States Environmental Protection Agency, Air and Radiation (6202J), EPA 430–F–97–005 Feb. 1997.
Animal Residuals Management Conference: Developing, Testing, and Implementing Technological Advances, 13–21, Nov. 14–16, 1999.

* cited by examiner

Primary Examiner—Chester T. Barry
(74) Attorney, Agent, or Firm—Timothy S. Corder; Vinson & Elkins L.L.P.

(57) ABSTRACT

Waste from confined animal feeding/growing operation is flushed from barn and routed to an enclosed anaerobic digester. A liquid portion of the digested waste is further treated with aerobic digestion and then clarified liquid is used to flush the barn and restart the cycle. High water volume used for frequent flushing of the barn combined with enclosed anaerobic digestion leads to control of odors.

1 Claim, 2 Drawing Sheets

METHOD FOR TREATMENT OF ANIMAL WASTE

BACKGROUND

Animal residuals from large concentrated animal feeding operations present unique problems for farm operators. The main problems relate to odor control and residual disposal. The residuals from hog operations consist mainly of feces, urine, hair, skin, spilled feed and water, and wash or flush water. The residuals mixtures are the major source of intense odor. The intensity of the odor increases with the age of the residuals. Water pollution is also a problem caused mainly when residuals are improperly land applied.

In many intense operations, animals such as hogs are confined in buildings. The animal residuals (manure) accumulate in the confined feeding and growing building until they are removed, typically by flushing with water or mechanical scraping. Mechanically scraped residual, while requiring more labor, is typically more concentrated, and the lower volume is desirable for storage and land application. A process for mechanical removal and processing of solid waste from cattle feed lots is described by Lynn in U.S. Pat. No. 3,973,043. The solid waste is collected and mixed with water to form a slurry that contains at least about 10 parts by weight of solid material, but can contain much higher solids concentration so long as the slurry can be easily pumped. This slurry then undergoes anaerobic fermentation to produce a methane gas stream and a residue material. The residue material may be used as a fertilizer, or subjected to an aerobic fermentation to produce a protein rich product usable in animal feed and a residue useful as soil fertilizer component. The inventor states that about 20% by weight of the solid material in the slurry is converted to vapor each day, so that the residence time in the anaerobic vessel is about 5 days when the system is in continuous operation. Residence time in the aerobic process may be about 10 to 14 days.

In the treatment of hog waste, water flushing is the common practice because of the decreased labor requirement. Unfortunately frequent water flushing increases the volume of water and wastes that have to be handled, so the amount of water used is minimized as much as possible. Typically the flushed residual is stored in earthen ponds or lagoons. The material in the lagoons is too dilute for significant anaerobic digestion and does not result in adequately treated waste. Lagoons are also sources of unpleasant odors, as the liquid is allowed to evaporate or is applied as irrigation. Thus the operator is faced with the choice of flushing less frequently, which results in more intense odor in the feeding and growing buildings, or more frequent flushing, which compounds the lagoon odor problems. Lagoons also present the risk of subsurface leakage that may contaminate drinking water supplies.

Enclosed storage and treatment facilities for odor control, such as are used in municipal treatment plants are too expensive to be practical for an agricultural operation. Therefore, confined growing/feeding operators (especially hog operations) typically utilize some type of lagoon system for handling of animal waste. There is a need, therefore, for an economical system for handling the animal waste from an intense feeding operation, especially the growing of hogs, that does not utilize open lagoons and that does not result in offensive odors from infrequent flushing of feeding/growing barns.

SUMMARY

The present disclosure addresses the problems of the art by providing systems and methods for total management of liquid and solid animal wastes to control odor emissions and to prevent pollution of land and water resources. The present disclosure provides additional advantages over the art, including the ability to accommodate a high volume of water, allowing the flushing of a typical barn on at least a daily basis. This allows the removal of fresh residuals before intense odor can be generated. The anaerobic digester is enclosed so that odors are not released, and methane produced by fermentation may be captured and utilized for energy. The liquid fraction is further treated by aerobic digestion to remove organic compounds, further reducing the odor of the treated water. This water can then be recycled as high volume flush water to remove fresh residuals without causing an odor problem, and excess water is also available for irrigation. There is about a 60% reduction in dry weight of the solids in the disclosed system and the transformed remaining solids do not produce intense odors and may therefore be used for land applications.

In certain preferred embodiments, the invention may be described as a system for treating animal waste, and includes the anaerobic digester(s), clarifiers and aerobic reactors configured such that the waste may be first subjected to enclosed anaerobic digestion followed by moving a liquid portion to an aerobic reactor and using clarified liquid from the aerobic reactor to flush a barn and restart the cycle. Although a preferred embodiment of such a system is described in Example 1, the system may be adapted to feeding barns designed to hold greater or few numbers of animals, either by reducing the size of the tanks, or by adding additional or larger tanks as needed. It is also understood that two or more barns may be connected to a single system, or a plurality of barns may be configured to each be connected to its own system individually. The specific systems described herein as preferred embodiments are directed to production of hogs because of the problems presented by intense hog raising and because of the high liquid content of hog waste. It is understood, however, that flush barns that are used to raise other species of domestic or farm animals or birds would also benefit from the described technology. Other animal species would include, but are not limited to beef or dairy cattle, sheep, goats, chickens, turkeys, or ratites. All such variations of the waste treatment systems are contemplated herein and fall within the scope and spirit of the appended claims.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
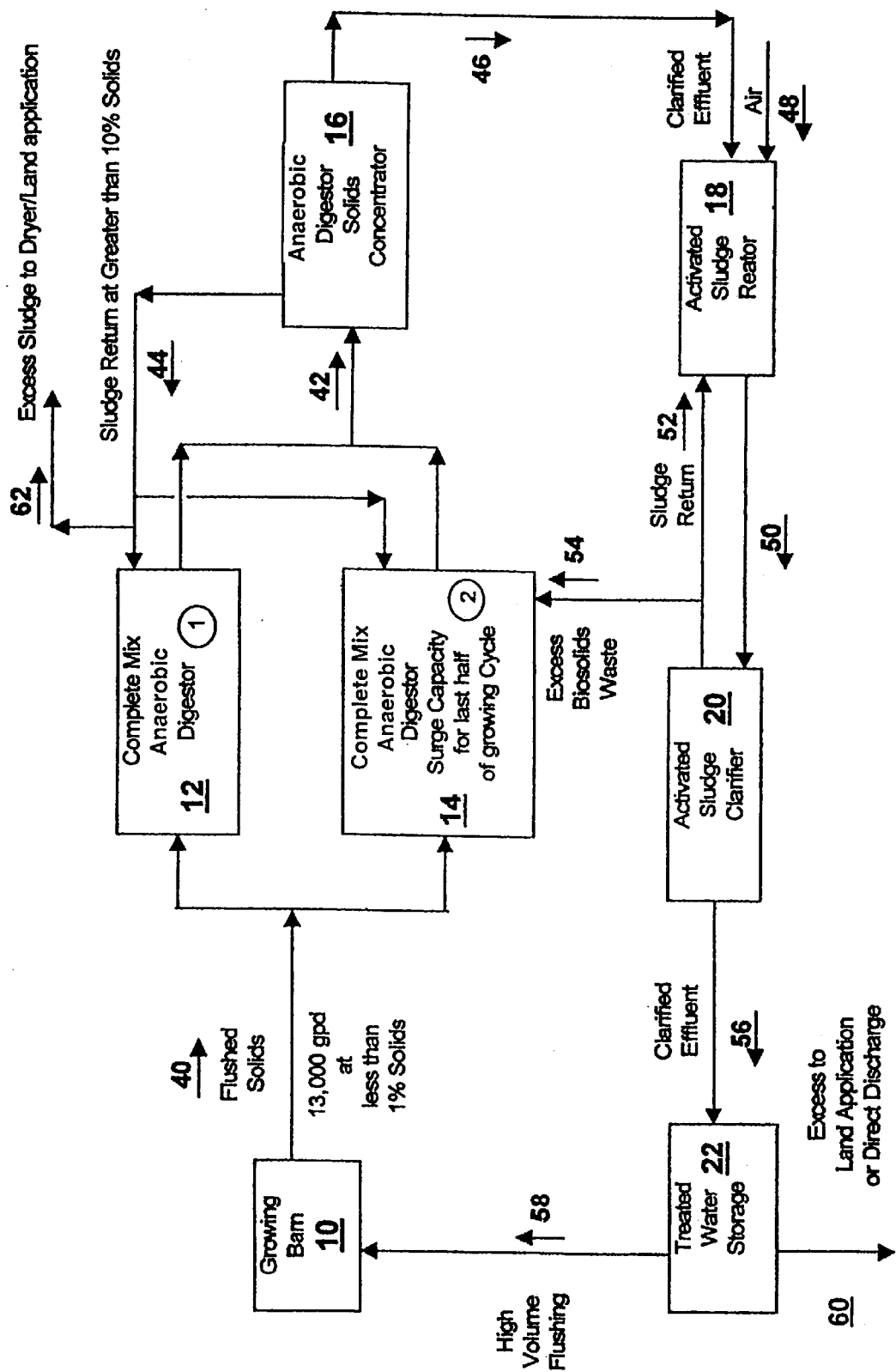
FIG. 1 is a flow diagram of an embodiment of the disclosed process.

The present disclosure may be more fully understood by reference to FIG. 1, which is a flow diagram of a process of treating waste from an animal growing barn 10. As used herein, a facility for feeding and/or rearing animals may be referred to as a barn, a nursery barn, an animal housing unit, or even a flush barn to indicate a facility that is substantially enclosed and in which animals are fed and housed for an entire growing cycle or a portion thereof. For the systems and methods of the present disclosure, a growing barn will have openings or grates in at least a portion of the floor and a reservoir or tank under the floor so that animal wastes and spillage from feeding will fall into or can be washed into a reservoir under the floor. In certain embodiments the system will include a sump or wet well to collect the waste from the barn, typically by gravity flow. In the practice of a preferred embodiment, a high volume of water is used to flush (arrow 40) the barn into a reservoir or wet well, and the flushed waste is pumped into an enclosed primary anaerobic digester 12, preferably a complete mix digester. The outflow (arrow 42) from the anaerobic digesters 12, 14 flows into an anaerobic digester solids concentrator 16. A portion of the sludge from the solids concentrator 16 may also be pumped (arrow 44) to the digesters 12, 14.

Figure 2:
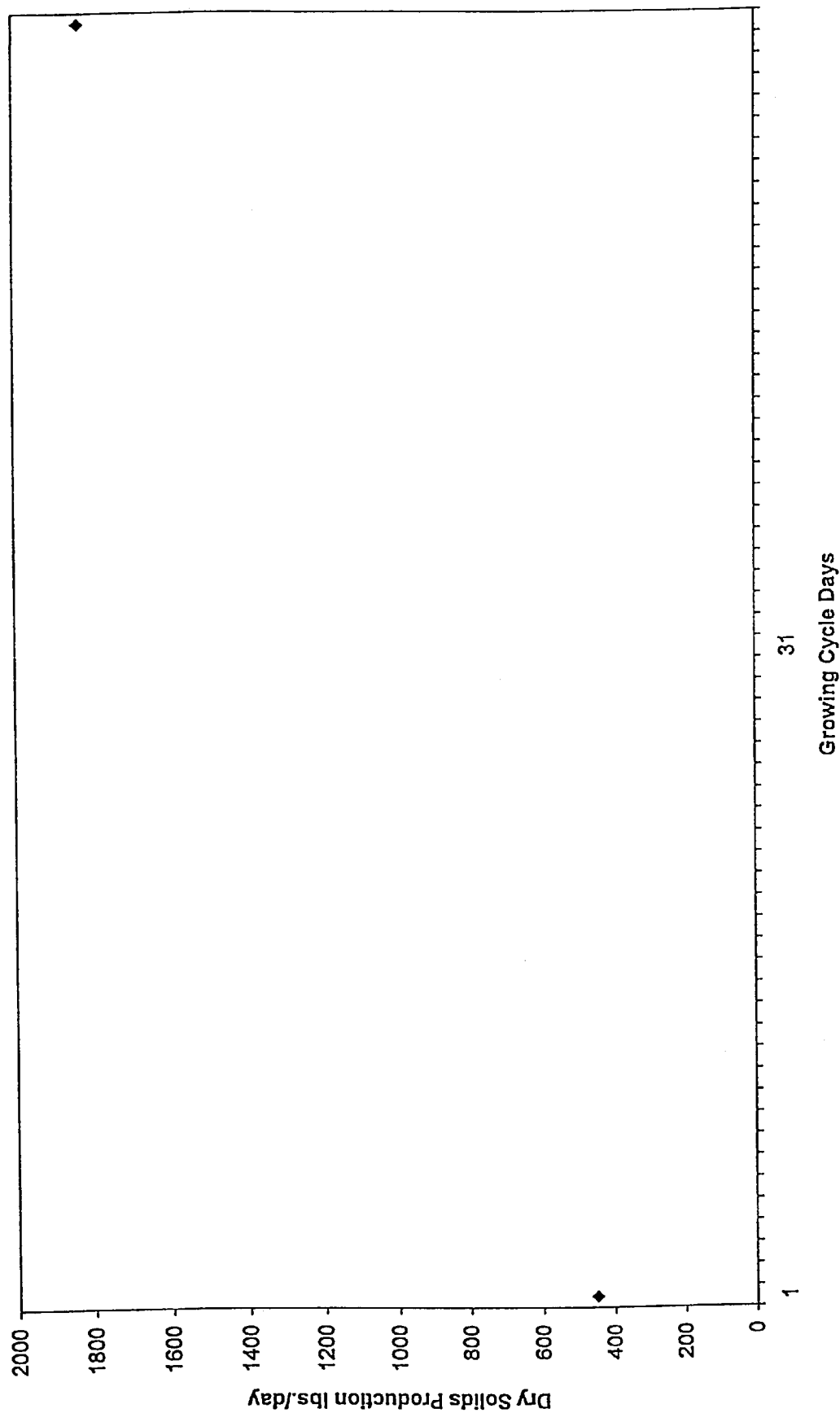
FIG. 2 is a graphical representation of dry solids production by a hog nursery barn during a 60 day growth cycle.

In barns designed to house around 3000 hogs, the volume of flush water may be about 13,000 gallons per day and will typically contain about 1% solids or less. As described in Example 1, below, a preferred anaerobic digester may have a capacity of about 40,000 gallons. This volume is sufficient for a 3,000 hog nursery during the early stages of the growing cycle, but may not be sufficient to handle the larger volume of waste produced in the second half of the growing cycle. Therefore, a secondary anaerobic digester 14 may be added to the system to provide surge capacity for the last half of the growing cycle. For example, during the startup cycle, the total flushed volume is routed to the primary digester 12 and a portion of the sludge from the solids concentrator 16 is routed to primary digester 12 until the primary digester 12 contains 10% solids. This occurs approximately 35–40 days into the growing cycle (See FIG. 2). When the primary digester 12 reaches 10% solids, the sludge return from the anaerobic concentrator is routed to the secondary digester 14 until the end of a growing cycle, at which time the secondary digester 14 should contain about 10% solids. As a new growing cycle begins, the total flushed solids are routed to the secondary digester 14, which overflows into the primary digester 12, and the sludge from the solids concentrator 16 are routed to the primary digester 12. When the solids concentration in the secondary digester 14 reaches about 1%, the flush volume is routed to the primary digester 12. When the solids in primary digester 12 reach about 10% the sludge from the concentrator is routed to the secondary digester 14 and the cycle is repeated throughout subsequent growing cycles. Excess sludge, which primarily results from a buildup of inorganic solids may also be removed (arrow 62) dried and/or applied to land as a fertilizer.

The clarified liquid from the anaerobic digester solids concentrator 16 flows (arrow 46) to an activated sludge reactor 18, where the liquid may be mixed with an oxygen source or air if necessary (arrow 48) for aerobic digestion. The effluent from the activated sludge reactor 18 is routed (arrow 50) to an activated sludge clarifier 20, for separation of solids from the liquid. Sludge from the activated sludge clarifier 20 may be pumped (arrow 52) to the activated sludge reactor 18 or excess solids may be routed (arrow 54) to an anaerobic digester 12 or 14. Clarified effluent from the activated sludge clarifier may be routed (arrow 56) to a water storage tank 22, and used for high volume flushing (arrow 58) of the barn 10 or excess water may be applied to land for irrigation (arrow 60). Alternatively the clarified liquid may be applied directly without use of a water storage tank.

In certain preferred embodiments, the present invention addresses several problems that plague the hog industry, in particular the odor and potential pollution created by intensive hog farming. The standard ways of handling hog waste has been to minimize the amount of water in order to create less waste volume. The waste is flushed to open lagoons for a combination of aerobic and anaerobic digestion and then spread on the land. Enclosed anaerobic digestion would eliminate much of the odor release, but most anaerobic digesters such as those used in municipal sewage treatment systems are too expensive and thus impractical for small farm operations. The present system, however, can be constructed using plywood tanks that are reinforced with wire cable and lined with a plastic or polymer material such as polyethylene, for example. Tanks can also be constructed of other materials such as fiberglass, concrete, or composite materials, but the plywood or oriented strand board (OSB) tanks are typically the least expensive and can be built on site, so no transportation of large tanks is necessary. The anaerobic digesters may be of any type known in the art, with complete mix digesters being the most preferred.

One of the primary advantages provided by the present invention is that the waste is totally enclosed and controlled once it leaves the barn. No open air lagoons are used that create odors and that are affected by weather conditions. In addition, rather than minimizing water as in prior art systems, the present invention uses large volumes of water and frequent flushing of the barn. In this way, the fresh manure is removed from the barn before it can create an intense odor problem. Flushing may be daily, or even every 6 or 12 hours in certain systems.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The terms and abbreviations used herein are intended to retain their ordinary meaning as known and used in the art. The following definitions are provided:

BOD: biochemical oxygen demand is defined as the quantity of oxygen used by bacteria in the breakdown of organic matter in a specified time, at a specified temperature, under specified aerobic conditions. Normally measured at 68° F. over a 5-day period to produce a value referred to as $BOD_5$.

MLSS mixed liquor suspended solids, a measure of biomass.

TSS: total suspended solids.

EXAMPLE 1

The following example describes a system and method for liquid flushing of a barn designed for raising hogs. The sizes of the equipment and calculations of treated waste in this example are based on the growing cycle of a nursery containing about 3000 hogs.

Design Basis for 3000 Hog Nursery Residuals Treatment System

Anaerobic Digester - 2 Tanks

| | |
|---|---|
| Size = | 30 ft diameter |
| | 8 ft high |

-continued

| Design Basis for 3000 Hog Nursery Residuals Treatment System | |
|---|---|
| | 40,000 gallon capacity |
| Nominal Solids Concentration = | 7% ± 3% |
| Solids Detention Time ≅ | 20 days |
| Operating Temperature = | 80–95° F. |
| Anaerobic Digester Solids Concentrator | |
| Size = | 10 ft Diameter |
| | 4 ft height |
| | 2,300 gal. capacity |
| Volumetric Detention Time = | 4 hrs |
| Overflow rate = | 600 gpd/ft$^2$ |
| Overflow area = | 21 ft$^2$ |
| Sludge removal rate = | 44 gpm |
| Solids Concentration in Effluent = (ppm) | 150 |
| Activated Sludge Reactor | |
| Size = | 20 ft Diameter |
| | 4 ft Height |
| | 9,500 gal. Capacity |
| Loading rate = | 100 lbs BOD/day |
| Volumetric loading rate = | .09 lbs/ft$^3$/day |
| MLSS = | 3000 mg/liter = .08 lb/gal |
| Excess Sludge Production = | 25 gpd @ 10% solids |
| Mix Rate = | tank volume turn over = 30 min. |
| Activated Sludge Reactor-Clarifier | |
| Size = | 10 ft Diameter |
| | 4 ft Height |
| | 2,600 gal. capacity |
| Volumetric detention Time = | 4 hrs |
| Overflow rate = | 600 gpd/ft$^2$ |
| Over flow area = | 21 ft |
| Sludge removal rate gal/hr = | 1,000 |
| Solid removal efficiency % = | 95 |
| Mass Balance for System treating Residuals from a 3000 Hog Nursery (Average Pig Weight 35 lbs) | |
| Inlet to System | |
| Total Dry Solids (lbs/day) = | 1,170 |
| Total Flushed Volume (gal/day) = | 13,000 |
| Relative concentration in flushed Volume | |
| BOD (ppm) = | 3000 |
| Nitrogen Total (ppm) = | 550 |
| Phosphorus as P$_2$O$_5$ (ppm) = | 330 |
| Potassium as K$_2$D (ppm) = | 330 |
| TSS (ppm) = | 10,000 |

| Outlet from System | | % Reduction In Flushed Volume |
|---|---|---|
| Total Dry Solids (lbs/day) = | 300 | 74 |
| Treated Total Volume (gal/day) = | 13,000 | — |
| Outlet from System | | |
| Relative Concentration in Treated Volume | % Reduction in Flushed Volume | |
| BOD$_5$ (PPM) = | 60 | 99 |
| Nitrogen (ppm) = | 5 | 99 |
| Phosphorus as P$_2$D$_5$ (ppm) = | 6 | 98 |
| Potassium as K$_2$D (ppm) = | 5 | 98 |
| Total Suspended Solids (ppm) = | 140 | 99 |

All of the compositions and methods disclosed and claimed herein can be made and executed without undue experimentation in light of the present disclosure. While the apparatus and methods of this invention have been described in terms of preferred embodiments, it will be apparent to those of skill in the art that variations may be applied to the apparatus and/or methods and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for treating animal waste from a continuously operating hog nursery barn comprising:

in a start up growth cycle:
(a) periodically flushing solid and liquid waste from said barn with water;
(b) routing the total flush volume of solid and liquid waste from said barn to a first enclosed anaerobic digester for controlled anaerobic digestion of said waste;
(c) routing effluent from said first anaerobic digester to an anaerobic digester solid concentrator effective to separate a liquid portion from a solid portion;
(d) routing sludge from the anaerobic solids concentrator to said first anaerobic digester until the first anaerobic digester contains about 10% solids;
(e) when the first digester obtains 10% solids as in step (d) routing sludge from said anaerobic solids concentrator to a second anaerobic digester until the end of said first growth cycle;

and in subsequent growth cycles;
(f) routing the total flush volume of solid and liquid waste from said barn to said second enclosed anaerobic digester for controlled anaerobic digestion of said waste, wherein said second anaerobic digester is in liquid communication with said first anaerobic digester;
(g) routing effluent from said anaerobic digesters to an anaerobic digester solids concentrator effective to separate a liquid portion from a solid portion;
(h) routing sludge from the anaerobic solids concentrator to said first anaerobic digester until the second anaerobic digester contains about 1% solids;
(i) when the solids in the second anaerobic digester reaches about 1%, routing the total flushed solids and liquids to said first anaerobic digester;
(j) when the solids in the first anaerobic digester reach about 10%, repeat cycle starting at step (e);

in start up and subsequent growth cycles;
(k) moving a first clarified liquid portion from said anaerobic solids concentrator to an aerobic sludge reactor and incubating said first clarified liquid under aerobic conditions to obtain an activated sludge portion;
(l) allowing the solids of step (k) to separate from the liquids to obtain a second clarified liquid portion; and
(m) using at least a portion of the second clarified liquid portion to flush additional solid and liquid waste from said barn as in step (a).

* * * * *